US009632550B2

(12) United States Patent
Atkinson (10) Patent No.: US 9,632,550 B2
(45) Date of Patent: Apr. 25, 2017

(54) CONTROLLING THE OPERATING TEMPERATURE OF A PORTABLE DEVICE BY DECREASING THE TEMPERATURE THRESHOLD OF A COMPONENT UPON DETECTING AN EVENT (71) Applicant: Hewlett-Packard Development Company, L.P., Houston, TX (US)

(72) Inventor: Lee Warren Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 14/650,888

(22) PCT Filed: Dec. 17, 2012

(86) PCT No.: PCT/US2012/070051
§ 371 (c)(1),
(2) Date: Jun. 10, 2015

(87) PCT Pub. No.: WO2014/098788
PCT Pub. Date: Jun. 26, 2014

(65) Prior Publication Data
US 2015/0331462 A1 Nov. 19, 2015

(51) Int. Cl.
G06F 1/24 (2006.01)
G06F 9/00 (2006.01)
(Continued)

(52) U.S. Cl.
CPC ............. *G06F 1/206* (2013.01); *G06F 1/203* (2013.01); *G06F 1/324* (2013.01); *G06F 1/3206* (2013.01);
(Continued)

(58) Field of Classification Search
CPC ........ G06F 1/206; G06F 1/203; G06F 1/3206; G06F 1/324; G06F 3/041; G06F 3/044;
(Continued)

(56) References Cited

U.S. PATENT DOCUMENTS 6,646,874 B2 11/2003 Pokharna et al.
6,691,197 B2 2/2004 Olson et al.
(Continued)

FOREIGN PATENT DOCUMENTS

CN 101587697 11/2009
CN 102099761 6/2011

OTHER PUBLICATIONS

Ian Morris, "Asus Transformer Pad TF300T Review," May 2, 2015, pp. 1-10, pocket-lint.com.
(Continued)

*Primary Examiner* — Robert Cassity
(74) *Attorney, Agent, or Firm* — HP Patent Department (57) ABSTRACT

A portable computing device detects if a user is touching the portable computing device. The portable computing device increases a temperature threshold for a component or of the portable computing device if the user is not touching the portable computing device. Based on the temperature threshold, the portable computing device modifies a parameter of a component for an operating temperature of the portable computing device to increase.

16 Claims, 5 Drawing Sheets

(51) Int. Cl.
  *G06F 1/20* (2006.01)
  *G06F 3/044* (2006.01)
  *G06F 13/14* (2006.01)
  *G06F 3/041* (2006.01)
  *G06F 1/32* (2006.01)

(52) U.S. Cl.
  CPC .............. *G06F 3/041* (2013.01); *G06F 3/044* (2013.01); *G06F 13/14* (2013.01); *G06F 2200/1637* (2013.01); *Y02B 60/1217* (2013.01)

(58) Field of Classification Search
  CPC ............. G06F 13/14; G06F 2200/1637; Y02B 60/1217
  USPC ........................................................ 713/100
  See application file for complete search history.

(56) References Cited

U.S. PATENT DOCUMENTS

| | | | |
|---|---|---|---|
| 7,793,027 B2 | 9/2010 | Mok et al. | |
| 7,983,035 B1 | 7/2011 | Ting | |
| 2007/0250729 A1 | 10/2007 | Thomas et al. | |
| 2011/0012840 A1 | 1/2011 | Hotelling et al. | |
| 2011/0231030 A1* | 9/2011 | Carter | G05D 23/1919 700/300 |
| 2011/0301777 A1 | 12/2011 | Cox et al. | |
| 2012/0011293 A1 | 1/2012 | Cheng et al. | |
| 2012/0271481 A1 | 10/2012 | Anderson et al. | |
| 2013/0090888 A1* | 4/2013 | Anderson | G06F 1/203 702/130 |
| 2013/0222306 A1* | 8/2013 | Aberg | G06F 1/206 345/173 |
| 2013/0339764 A1* | 12/2013 | Lee | G06F 1/3206 713/300 |

OTHER PUBLICATIONS

International Search Report and Written Opinion, International Application No. PCT/US2012/070051, Date of Mailing: Aug. 21, 2013, pp. 1-8.

* cited by examiner

Fig. 5

CONTROLLING THE OPERATING TEMPERATURE OF A PORTABLE DEVICE BY DECREASING THE TEMPERATURE THRESHOLD OF A COMPONENT UPON DETECTING AN EVENT

BACKGROUND

When managing an operating temperature of a computing device, a user can access one or more settings of a Basic Input/Output System (BIOS) or an operating system of the computing device. The user can modify one or more settings of the BIOS or the operating system for the computing device to operate cooler or hotter based on a preference of the user.

BRIEF DESCRIPTION OF THE DRAWINGS

In the accompanying drawings, like numerals refer to like components or blocks. The following detailed description references the drawings, wherein.

DETAILED DESCRIPTION

A portable computing device includes a sensor, such as a capacitive sensor, a touch sensor, a proximity sensor, an infra-red component, an image capture component, accelerometer, a gyroscope, and/or a global positioning system component, to detect if a user is touching the portable computing device. The sensor can detect for the user touching a portion of the portable computing device, such as a front panel, a rear panel, a side panel, a corner, and/or an edge of the portable computing device. The sensor can also detect for the portable computing device repositioning to determine if the user is touching the portable computing device.

If a user is not detected to touch, hold, and/or reposition the portable computing device, a thermal module proceeds to increase a temperature threshold for a component of the portable computing device or for the portable computing device. The thermal module is a hardware or software component of the portable computing device which manages a temperature threshold for one or more components of the portable computing device. The temperature threshold for a component corresponds to a specified temperature of the component which is not to be exceeded and the temperature threshold for the portable computing device corresponds to a specified temperature of the portable computing device which is not to be exceeded.

Based on the modified temperature threshold, a controller of the portable computing device modifies a parameter of at least one component based on the temperature threshold for an operating temperature of the portable computing device to increase. The operating temperature of the portable computing device corresponds to an amount of heat which can be felt by a user if the user is touching or holding the portable computing device. The operating temperature can be a surface temperature, a chassis temperature and/or a component temperature of the portable computing device.

In one example, if the thermal module increases a temperature threshold of a component, such as the controller, the controller can modify a parameter to increase the operating speed of the controller. As a result, a performance of the controller and/or the portable computing device can be increased and the controller generates more heat for an operating temperature of the portable computing device to increase.

In another example, if the thermal module increases a temperature threshold of a component, such as a thermal dissipation component, the controller can modify a parameter of the thermal dissipation component to decrease the amount of heat dissipated from a component and/or from the portable computing device. The thermal dissipation component can be a mechanical fan component and/or a liquid cooling component. As a result, an amount of power supplied to the thermal dissipation component can be decreased and the portable computing device can conserve power.

By increasing the operating temperature of the portable computing device, the component and/or the portable computing device can be allowed to generate more heat and become hotter if the user is not detected to touch the portable computing device. As a result, a performance of the portable computing device can be increased and/or the portable computing device can conserve power utilized by a thermal dissipation component if the user is not detected to touch the portable computing device.

Figure 1:
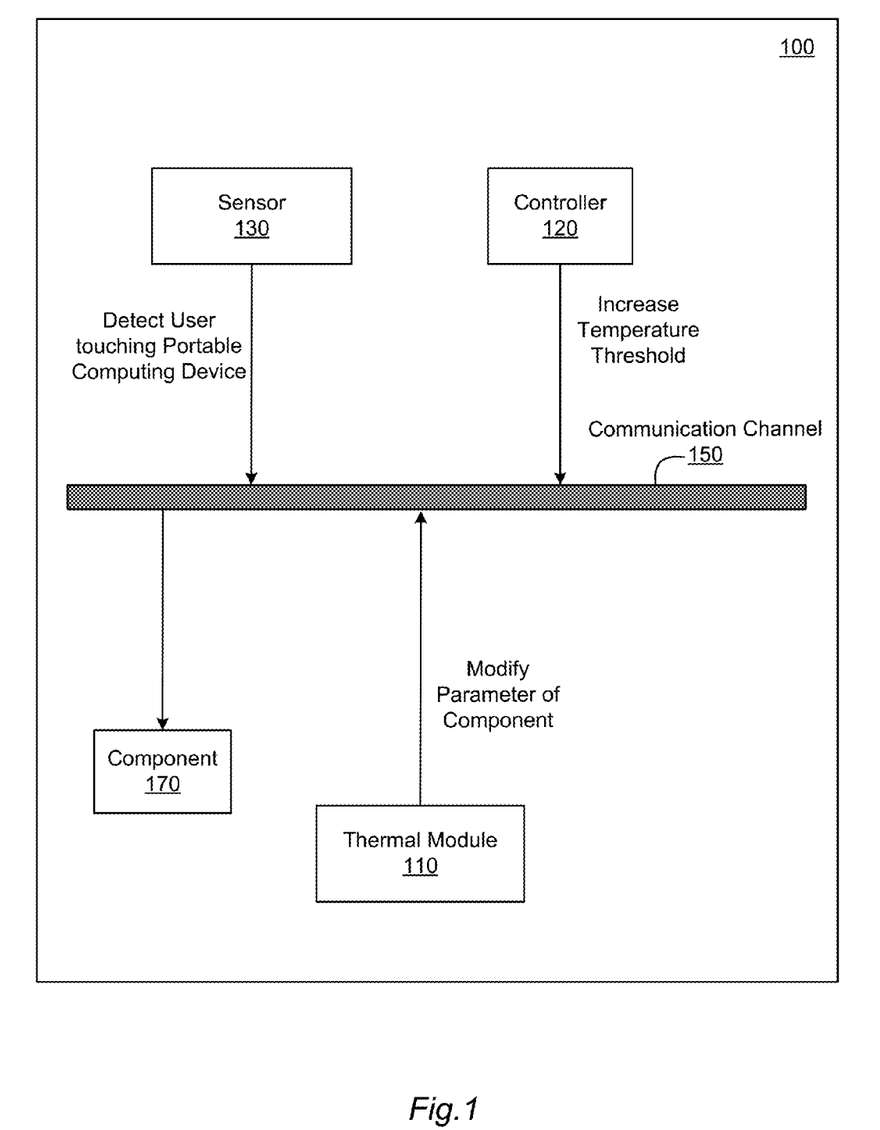
FIG. 1 illustrates a portable computing device with a sensor, a thermal module, a component, and a controller according to an example.

FIG. 1 illustrates a portable computing device 100 with a sensor 130, a thermal module 110, a component 170, and a controller 120 according to an example. The portable computing device 100 can be a notebook, a netbook, a tablet, a smart phone, a cellular device, an all-in-one system, and/or any additional portable computing device. The portable computing device 100 includes a sensor 130, a thermal module 110, a component 170, a controller 120, and a communication channel 150 for the controller 120 and components of the portable computing device 100 to communicate with one another. In other implementations, the portable computing device 100 includes additional components in addition to and/or in lieu of those noted above.

The sensor 130 is a hardware component, such as a capacitive sensor, a touch sensor, a proximity sensor, an infra-red component, an image capture component, accelerometer, a gyroscope, and/or a global positioning system component, to detect if a user is touching the portable computing device 100. The sensor 130 can detect one or more portions of a chassis of the portable computing device 100 for a hand, palm, and/or finger touching it. If the sensor 130 does not detect a hand, palm, and/or finger at a portion of the portable computing device 100, the user is not touching the portable computing device 100. In another implementation, when detecting for the user touching the portable computing device 100, the sensor 130 detects for the portable computing device 100 repositioning. If the portable computing device 100 is detected to be stationary for a predefined amount of time, the user is determined to not be touching the portable computing device 100.

Based on whether a user is detected to touch the portable computing device 100, a thermal module 110 maintains or modifies a temperature threshold for a component 170 of the portable computing device 100. For the purposes of this application, the thermal module 110 is a component of the portable computing device 100 which manages a temperature threshold for one or more components of the portable computing device 100. In one implementation, the thermal module 110 is a hardware component, such as a processor, a controller, and/or a power source, of the portable computing device 100. In another implementation, the thermal module 110 is a software module of the portable computing device 100. A temperature threshold for a component corresponds to a specified temperature of the component which is not to be exceeded.

In one example, if a user is not detected to touch the portable computing device 100, the thermal module 110 increases a temperature threshold of a component 170. In another example, if a user is detected to be touching the portable computing device 100, the thermal module 110 can maintain a temperature threshold for a component 170 or the thermal module 100 can decrease the temperature threshold for a component 170. The component 170 is hardware component of the portable computing device 100, such as the controller 120, a processor, a memory component, a communication component, a storage device, a thermal dissipation component, and/or any additional component which produces or dissipates heat.

The thermal module 110 can notify the controller 120 of a modified temperature threshold for a component 170. In response, the controller 120 can modify a parameter of the corresponding component 170 for the component 170 to generate more or less heat. The controller 120 can be a processor, a semiconductor-based microprocessor, an integrated circuit (IC), or any other device suitable for modifying a parameter of a component. When modifying a parameter of a component 170, the controller 120 can modify one or more settings of the component 170 or the controller 120 can modify a mode of operation of the component 170.

In one implementation, the controller 120 modifies a setting of the component 170 by increasing or decreasing an operating speed of the component 170. Increasing an operating speed of the component 170 can include supplying more power to the component 170 and/or increasing a clock rate or frequency of the component 170. As a result, the component 170 and the portable computing device 100 can produce more heat and the portable computing device 100 becomes hotter to touch. Decreasing an operating speed of the component 170 can include supplying less power to the component 170 and/or reducing a clock rate of the component 170. As a result, the component 170 and the portable computing device 100 can produce less heat and the portable computing device 100 becomes cooler to touch.

In another implementation, modifying a parameter of the component 170 includes the controller 120 modifying a parameter of a thermal dissipation component used to remove heat from the component 170 or from the portable computing device 100. For example, if the thermal module 110 increases the temperature threshold for a component, the controller 120 can modify a parameter of the thermal dissipation component for the thermal dissipation component to remove less heat from the component 170 and/or from the portable computing device 100. In another example, if the temperature threshold for a component 170 is decreased, the controller 120 can modify a parameter of the thermal dissipation component for the thermal dissipation component to remove more heat from the component 170 and/or from the portable computing device 100.

Figure 2:
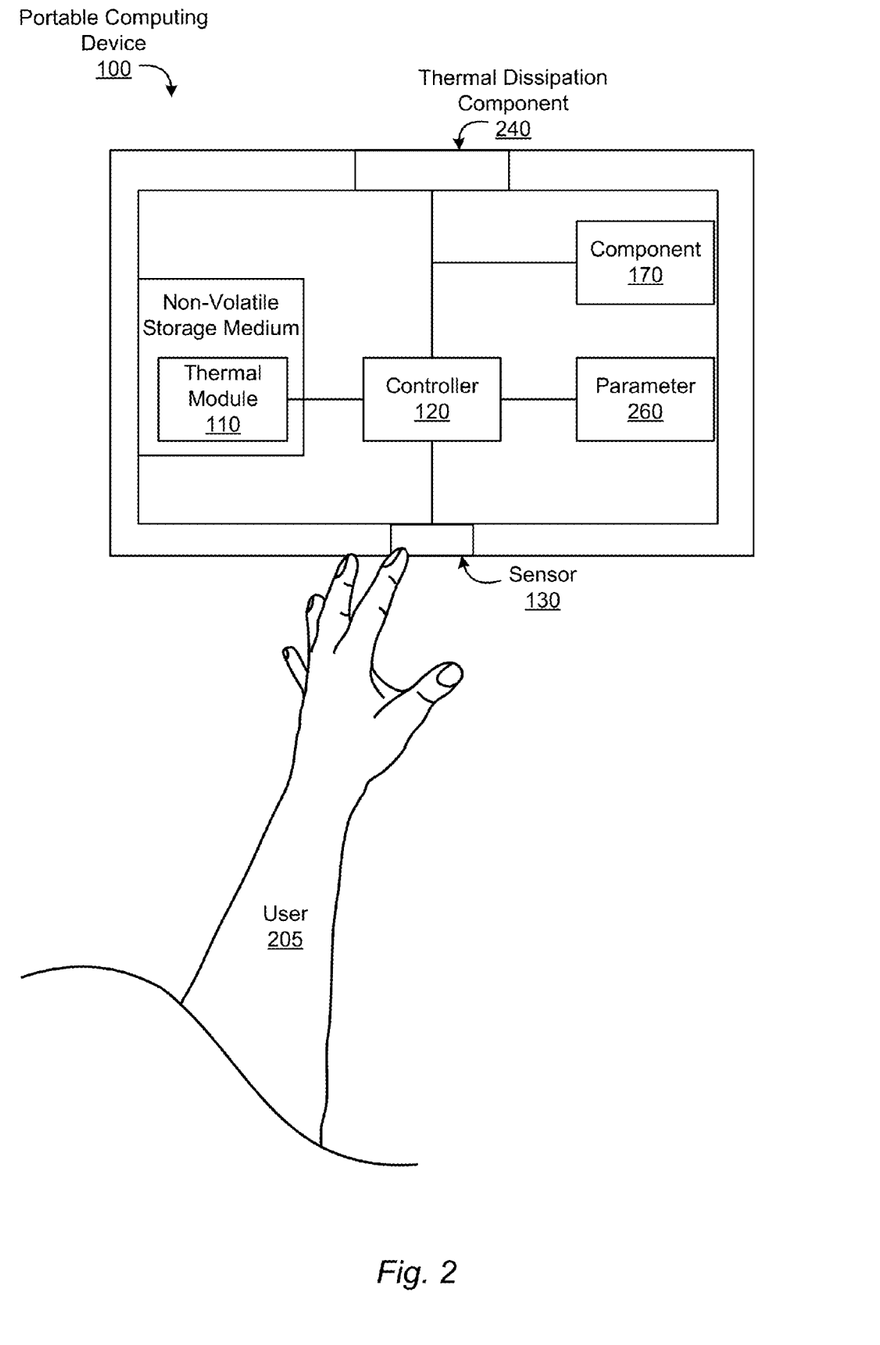
FIG. 2 illustrates a sensor detecting for a user touching a portable computing device according to an example.

FIG. 2 illustrates a sensor 130 detecting for a user 205 touching a portable computing device 100 according to an example. The user 205 can be any person which can touch, hold, and/or reposition the portable computing device 100. In one implementation, the sensor 130 is a capacitive sensor, a touch sensor, a proximity sensor, an infra-red component, and an image capture component to detect for a finger, palm, and/or hand of the user 205 touching a portion of the portable computing device 100. A portion of the portable computing device 100 can include a front panel, a rear panel, an edge, and/or a corner of the portable computing device 100.

In another implementation, the sensor 130 is an accelerometer, a gyroscope, and a global positioning system component for detecting if the portable computing device 100 is repositioning or if the portable computing device 100 is stationary. If the sensor 130 detects the portable computing device 100 repositioning, the user 205 can be determined to be touching or holding the portable computing device 100. If the sensor 130 does not detect the portable computing device 100 repositioning for a predefined amount of time, the user 205 can be determined to not be touching or holding the portable computing device 100. The predefined amount of time can be specified by the controller 120, the sensor 130, the thermal module 110, and/or the user 205.

In other implementations, the sensor 130 includes a docking component and the sensor 130 detects for the portable computing device 100 coupling to a docking component. The docking component can include a base or an expansion device which includes a component, such as a keyboard, a touchpad, a storage component, and/or a display component, for the portable computing device 100. If the sensor 130 detects the portable computing device 100 coupled to the docking station, the user 205 will be determined to not be touching the portable computing device 100. If the portable computing device 100 is not coupled to the docking component, the user 205 can be determined to be touching the portable computing device 100.

The sensor 130 passes information of whether the user 205 is touching the portable computing device 100 to the thermal module 110. The thermal module 110 is a component which manages a temperature threshold for a component 170 of the portable computing device 100. In one implementation, the thermal module 110 is a hardware component, such as a circuit integrated with or coupled to another component, such as the controller 120. In other implementations, the thermal module 110 is firmware embedded onto one or more components or the thermal module 110 is a software module executable by the controller 120 from a non-volatile computer readable medium. The computer readable medium is a tangible apparatus that contains, stores, communicates, or transports the thermal module 110 for use by or in connection with the portable computing device 100. In one embodiment, the computer readable medium is a hard drive, a compact disc, a flash disk, a network drive or any other form of tangible apparatus coupled to the portable computing device 100.

If the thermal module 110 is notified that the user 205 is not touching the portable computing device 100, the thermal module 110 proceeds to increase a temperature threshold of a component 170. In another implementation, the thermal module 110 increases a temperature threshold for the portable computing device 100. The temperature threshold for a component 170 corresponds to a specified temperature of the component 170 which is not to be exceeded. The temperature threshold for the portable computing device 100 corresponds to a specified temperature of the portable computing device 100 which is not to be exceeded. In other implementations, if the thermal module 110 is notified that the user 205 is touching the portable computing device 100, the thermal module 110 can maintain or decrease a temperature threshold of a component 170 or of the portable computing device 100.

The thermal module 110 can wait a predefined amount of time before increasing the temperature threshold. The predefined amount of time can be a few second or minutes and is defined by the thermal module 110, the sensor 130, the controller 120, and/or the user 205. By waiting the predefined amount of time, the thermal module 110 does not increase the temperature threshold of the component 170 and/or of the portable computing device 100 if the user 205 steps away or stops touching the portable computing device 100 for a brief instance.

A component 170 is a hardware component of the portable computing device 100 which produces or dissipates heat. In one example, the component 170 can be the controller 120, a processor, a memory component, a storage component, a communication component, and/or any additional component which produces heat. The amount of heat generated by the component 170 can be controlled in response to the controller 120 modifying a parameter 260 of the component 170. The parameter 260 of the component 170 corresponds to a setting and/or a mode of operation of the component 170. In another example, the component 170 can be a thermal dissipation component 240, such as a mechanical fan and/or a liquid cooling component to remove heat produced by the component 170 and/or from the portable computing device 100.

In one implementation, when modifying a parameter of the component 170, the controller 120 modifies a parameter of the component 170 to increase an operating speed of the component 170. In response, a performance of the component 170 can be increased, an amount of power utilized by the component 170 can be increased, and the component 170 generates more heat. For example, the controller 120 can modify a parameter for itself to increase the operating speed of the controller 120. In response, the controller 120 can utilize more power and generate more heat. In another implementation, when modifying a parameter of the component 170, the controller 120 modifies a parameter of the thermal dissipation component 240. The controller 120 can modify a parameter 260 for the thermal dissipation component 240 to dissipate less heat from the component 170 and/or the portable computing device 100. As a result, a performance of the portable computing device 100 can be maintained while an amount of power used by the component 170 is increased and an operating temperature of the portable computing device 100 is increased.

In another example, if the thermal module 110 reduces a temperature threshold for a component 170, the controller 120 can modify a parameter 260 of a component 170 to reduce the operating temperature of the portable computing device 100. The controller 120 can modify a parameter of a component 170 to reduce an operating speed of the component 170. In another implementation, the controller 120 can modify a parameter of the thermal dissipation component 240 to dissipate more heat from the component 170 and/or from the portable computing device. As a result, an operating temperature of the portable computing device 100 can be decreased.

Figure 3A:
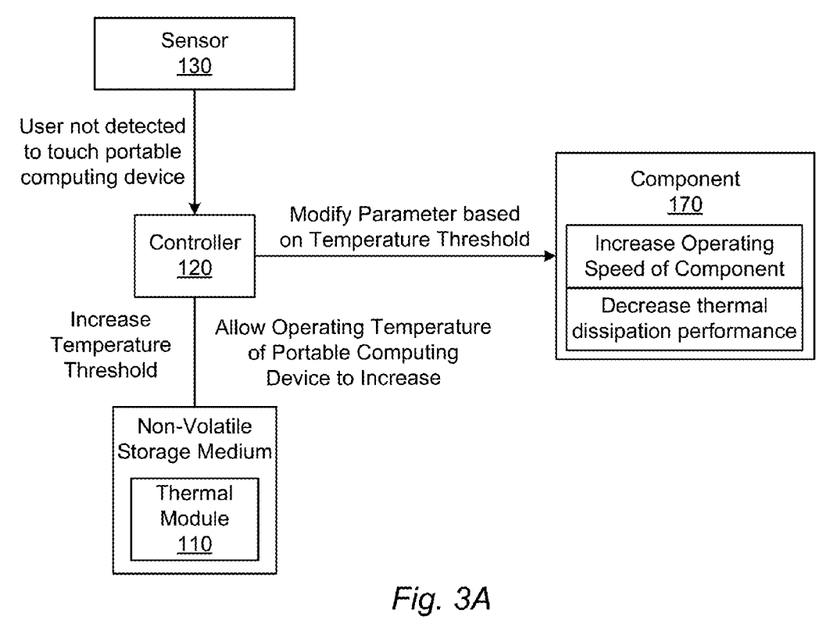
FIG. 3A and FIG. 3B illustrate a thermal module modifying a temperature threshold and a controller modifying a parameter of a component according to examples.
Figure 3B:
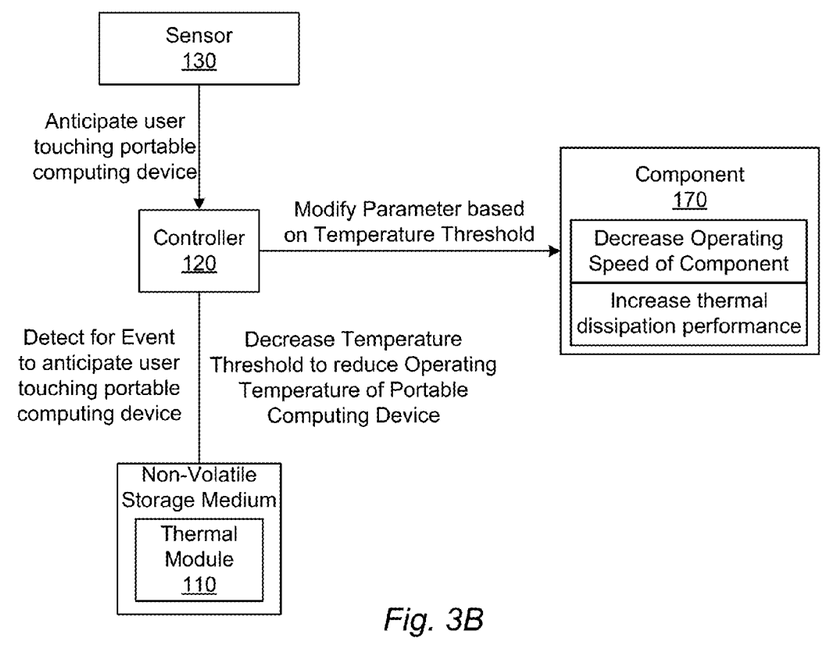

FIG. 3A and FIG. 3B illustrate a thermal module modifying a temperature threshold and a controller modifying a parameter of a component according to an example. In one example, as shown in FIG. 3A, a user is not detected by the sensor 130 to touch the portable computing device. The sensor 130 can notify the controller 120 and/or the thermal module 110 that the user not touching the portable computing device. In response, the thermal module 110 proceeds to increase a temperature threshold for a component 170. In one implementation, the thermal module 110 waits a predefined amount of time before increasing the temperature threshold.

In response to the temperature threshold for the component 170 increasing, the controller 120 modifies a parameter of the component 170 based on the increased temperature threshold to allow an operating temperature of the portable computing device to increase. If the temperature threshold is increased, the controller 120 can modify a parameter of the component 170 such that an operating speed of the component 170 is increased. The controller 120 can modify a setting or operation mode of the component 170 such that a clock rate or frequency of the component 170 is increased. The controller 120 can also modify a parameter of the component 170 or a power source such that the component 170 receives more power from a power source of the portable computing device. In one implementation, if the temperature threshold is increased, the controller 120 can also modify a parameter of a thermal dissipation component to decrease an amount of heat removed from the component 170 and/or from the portable computing device.

As shown in FIG. 3B, as the operation temperature of the portable computing device is increased, the sensor 130 and/or the controller 120 can anticipate the user touching a portion of the portable computing device. The sensor 130 can detect for a hand, finger, and/or palm of the user coming within proximity of the portable computing device. The sensor 130 can increase a detection range for the user. In one implementation, when anticipating the user touching the portable computing device, the controller 120 detects for an event from the portable computing device. The event can be a message or notification from an application prompting for the user's attention. In one example, the event can be a notification or a message that media currently being outputted by the portable computing device is about to end. In another example, the event can be the arrival of an email, a text message, and/or a request for video or audio call.

If the sensor 130 detects the user coming within proximity of the portable computing device and/or if the controller 120 detects an event, the user will be anticipated to touch the portable computing device. In response, the thermal module 110 decreases a temperature threshold for the component 170 to reduce an operating temperature of the portable computing device. The controller 120 modifies a parameter of the component 170 based on the decreased temperature threshold.

If the temperature threshold is decreased, the controller 120 can modify a parameter of the component 170 such that an operating speed of the component 170 is decreased. The controller 120 can modify a setting or operation mode of the component 170 such that a clock rate of the component 170 is decreased. The controller 120 can also modify a setting or operation mode of the component 170 or a power source such that an amount of power provided and/or utilized by the component 170 is reduced. In another implementation, if the temperature threshold is decreased, the controller 120 can modify a parameter of a thermal dissipation component to increase an amount of heat removed from the component 170 and/or the portable computing device. The controller 120 can also instruct the thermal dissipation component to operate at a max setting to reduce an amount of time for the component and/or the portable computing device to cool.

Figure 4:
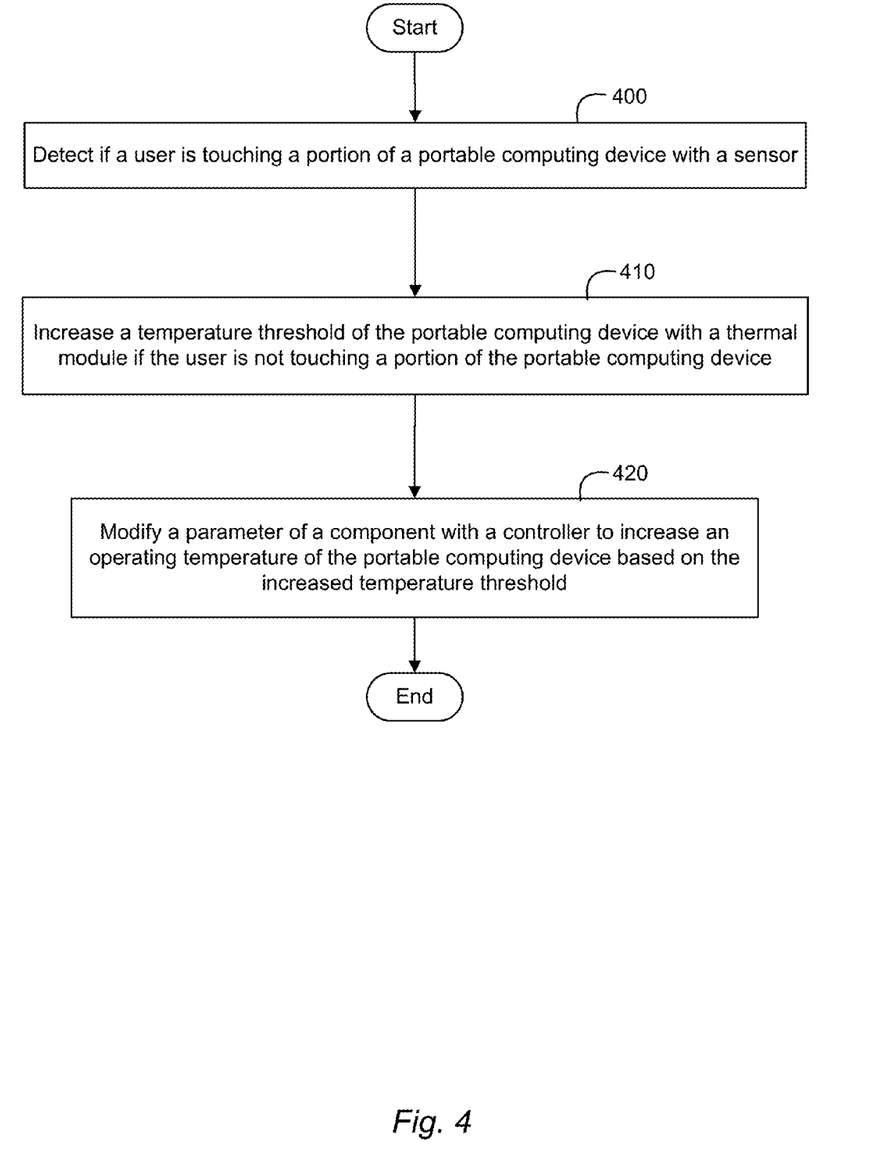
FIG. 4 is a flow chart illustrating a method for a managing a portable computing device according to an example.

FIG. 4 is a flow chart illustrating a method for a managing a portable computing device according to an example. A sensor detects for a user is touching a portion of a portable computing device at 400. If a user is detected to touch, hold, or reposition the portable computing device, a thermal module increases a temperature threshold of the portable computing device at 410. Based on the increased temperature threshold, a controller proceeds to modify a parameter of at least one component to increase an operating temperature of the portable computing device at 420. The method is then complete. In other embodiments, the method of FIG. 4 includes additional steps in addition to and/or in lieu of those depicted in FIG. 4.

Figure 5:
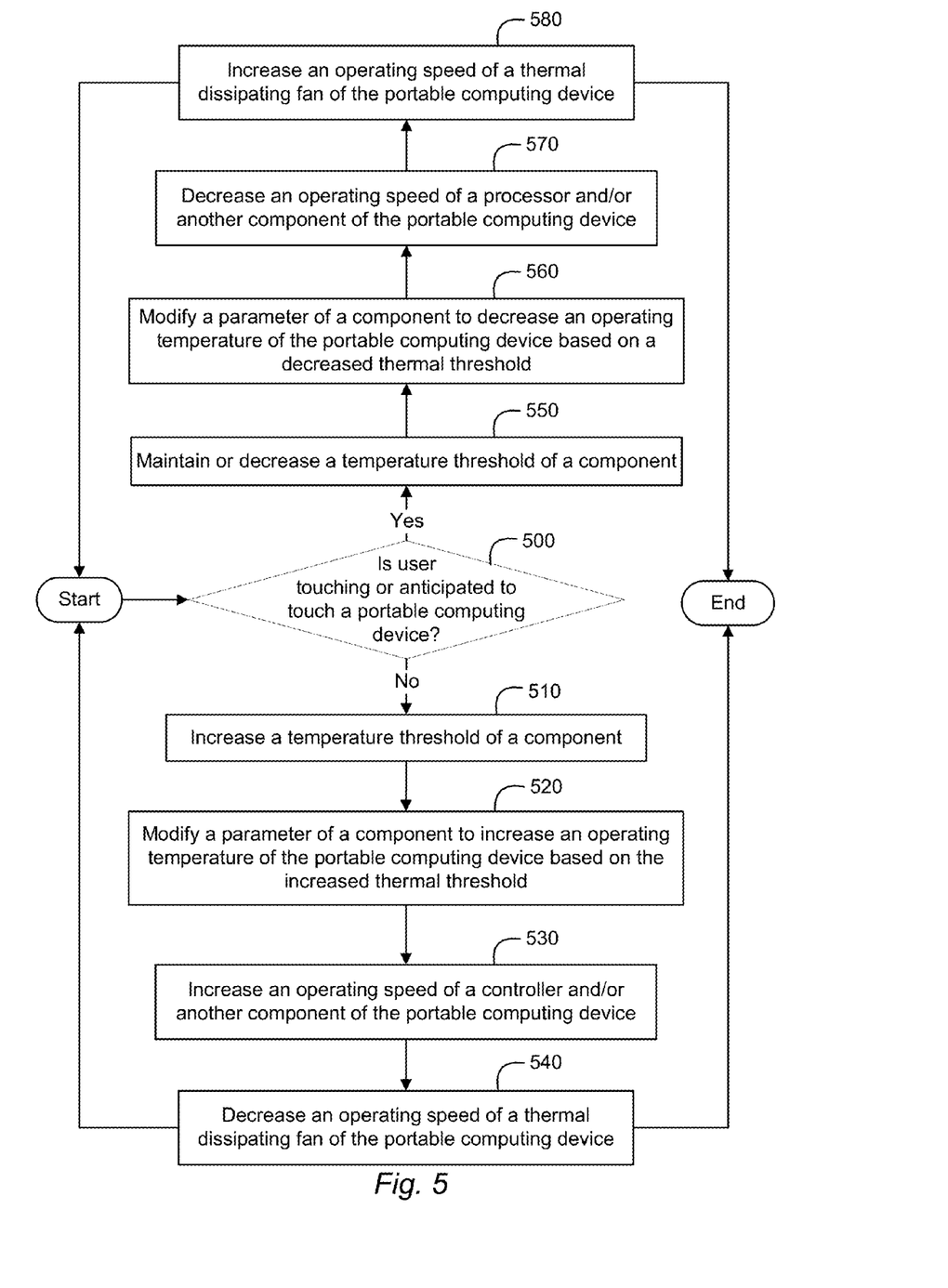
FIG. 5 is a flow chart illustrating a method for a managing a portable computing device according to another example.

FIG. 5 is a flow chart illustrating a method for a managing a portable computing device according to another example. A sensor initially detects for a user touching a portion of a portable computing device at 500. If the user is not detected to touch the portable computing device, a temperature module proceeds to increase a temperature threshold of a component of the portable computing device at 510. Based on the increased temperature threshold, a controller modifies a parameter of a component to increase an operating temperature of the portable computing device at 520. Modifying a parameter can include increasing an operating speed of a controller and/or another component of the portable computing device at 530. Modifying a parameter can also include decreasing an operating speed of a thermal dissipating component of the portable computing device at 540. As the portable computing device operates at the higher temperature, the sensor can continue to detect for a user touching a portion of the computing device and the controller can detect for an event anticipating the user touching a portion of the portable computing device at 500.

If the user is detected to touch a portion of the portable computing device or if the user is anticipated to touch a portion of the portable computing, the temperature module proceeds to decrease the temperature threshold of a component of the portable computing device at 550. Based on the decreased temperature threshold, a controller modifies a parameter of a component to decrease an operating temperature of the portable computing device at 560. Modifying a parameter can include decreasing an operating speed of a controller and/or another component of the portable computing device at 570. Modifying a parameter can also include increasing an operating speed of a thermal dissipating component of the portable computing device at 580. The method is then complete. In other embodiments, the method of FIG. 5 includes additional steps in addition to and/or in lieu of those depicted in FIG. 5.

What is claimed is:

1. A portable computing device comprising:
   an operation controller to detect an occurrence of an event including an electronic message arriving at the portable computing device;
   a sensor to detect touching of the portable computing device;
   a thermal controller to decrease a temperature threshold for a component of the portable computing device when the operation controller detects the occurrence of the event; and
   the operation controller to modify a parameter of at least one component based on the thermal controller being activated to decrease an operating temperature of the portable computing device.

2. The portable computing device of claim 1 wherein modifying a parameter of a component includes decreasing an operating speed of the component when the operation controller detects the occurrence of the event.

3. The portable computing device of claim 1 further comprising a thermal dissipation component to dissipate heat from the portable computing device.

4. The portable computing device of claim 3 wherein modifying a parameter of a component includes modifying a parameter of the thermal dissipation component for the operating temperature of the portable computing device to decrease.

5. The portable computing device of claim 1 wherein the sensor detects when the portable computing device is coupled to a docking component when detecting touching of the portable computing device.

6. A method for managing a portable computing device comprising:
   detecting occurrence of an event including an electronic message arriving at the portable computing device with an operation controller;
   detecting touching of a portion of the portable computing device with a sensor;
   increasing a temperature threshold of the portable computing device with a thermal controller when no event is detected to occur; and
   modifying a parameter of a component of the portable computing device with the operation controller based on the thermal controller being activated to increase an operating temperature of the portable computing device.

7. The method for managing the portable computing device of claim 6 wherein modifying a parameter of a component includes increasing an operating speed of the operation controller of the portable computing device.

8. The method for managing the portable computing device of claim 6 wherein modifying a parameter of the component includes decreasing an operating speed of a thermal dissipating fan of the portable computing device.

9. The method for managing the portable computing device of claim 6 further comprising detecting touching of a portion of the portable computing device when the operating temperature of the portable computing device is increased.

10. The method for managing the portable computing device of claim 6 further comprising decreasing the temperature threshold of the thermal controller and modifying a parameter of a component based on the decreased temperature threshold when touching of a portion of the portable computing device is detected or when anticipating touch of a portion of the portable computing device based on the occurrence of the event.

11. A non-transitory computer-readable medium comprising instructions that when executed by a processor will cause an operation controller to:
   detect an event including an electronic message arriving at a portable computing device;
   modify a temperature threshold of a thermal controller of the portable computing device based on detection of the event; and
   modify a parameter of at least one component of the portable computing device based on the thermal controller being activated to modify an operating temperature of the portable computing device.

12. The non-transitory computer-readable medium of claim 11 wherein:
   the operation controller increases the temperature threshold of the thermal controller for the operating temperature of the portable computing device to increase when no event is detected; and the operation controller decreases the temperature threshold of the thermal controller for the operating temperature of the portable computing device to decrease when the event is detected.

13. The portable computing device of claim 1 wherein when the sensor detects an absence of touch for an amount of time, the thermal controller proceeds to increase the temperature threshold for a component of the portable computing device, wherein the operation controller modifies a parameter of at least one component based on the thermal controller being activated to increase performance of the portable computing device.

14. The portable computing device of claim 3 wherein an operating speed of the thermal dissipation component is decreased when the sensor detects the absence of touch for some period of time.

15. The portable computing device of claim 1 wherein the sensor is at least one of an accelerometer, a gyroscope, and a global positioning system component for detecting when the portable computing device is repositioning or when the portable computing device is stationary when detecting touching of the portable computing device.

16. The portable computing device of claim 1 wherein the sensor is at least one of a capacitive sensor, a touch sensor, a proximity sensor, an infra-red component, and an image capture component to detect touching of the portable computing device.

\* \* \* \* \*